250/201

United States Patent [19]

Oku et al.

[11] Patent Number: 4,541,084
[45] Date of Patent: Sep. 10, 1985

[54] FOCUS SERVO SYSTEM HAVING OBJECT LENS PROTECTION CIRCUIT FOR AN OPTICAL DISC PLAYER

[75] Inventors: Masuo Oku, Kamakura; Masami Yamashita, Yokohama; Yoshio Miura, Yokohama; Motoyuki Suzuki, Yokohama, all of Japan

[73] Assignee: Hitachi, Ltd., Tokyo, Japan

[21] Appl. No.: 474,031

[22] Filed: Mar. 10, 1983

[30] Foreign Application Priority Data

Mar. 10, 1982 [JP] Japan ................... 57-36382

[51] Int. Cl.³ .............................................. G11B 7/00
[52] U.S. Cl. ........................................ 369/45; 369/46; 250/201
[58] Field of Search ............... 369/45, 46; 350/518, 350/563; 250/201DF

[56] References Cited
U.S. PATENT DOCUMENTS 3,932,700  1/1976  Snopko ............................. 369/46
3,974,327  8/1976  Van Dijk ........................... 369/45
4,128,847  12/1978  Roullet et al. .................... 369/45
4,286,147  8/1981  Tsuboi et al. ...................... 369/45
4,337,532  6/1982  Oprandi et al. .................... 369/45
4,426,690  1/1984  Motoyama ........................ 369/45

Primary Examiner—Raymond F. Cardillo, Jr.
Assistant Examiner—Alan K. Aldous
Attorney, Agent, or Firm—Antonelli, Terry & Wands

[57] ABSTRACT

A focus servo system for an optical video disc player. A pair of signals generated by two pairs of photo-cells are supplied to an adder and a differential amplifier, an output signal of the adder is supplied to a first comparator and an output signal of the differential amplifier is supplied to a second comparator. When an output signal of the adder reaches a reference voltage of the first comparator, a focus servo pull-in range is detected. Thereafter, when an output signal of the differential amplifier reaches a reference voltage of the second comparator, a stable operation condition of the focus servo system is detected and a servo system loop is closed so that a malfunction is prevented.

5 Claims, 17 Drawing Figures

FIG. 2 PRIOR ART
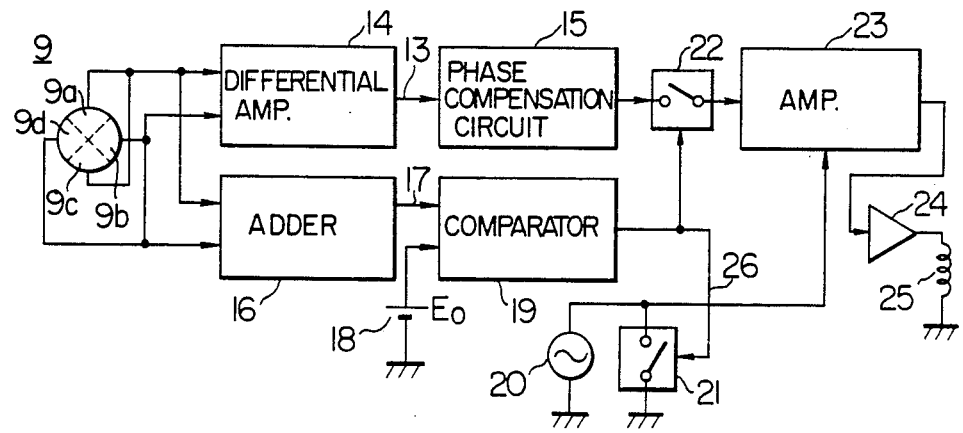
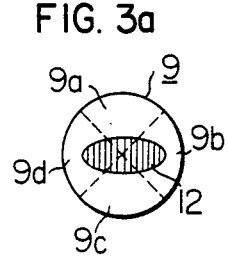
FIG. 3a
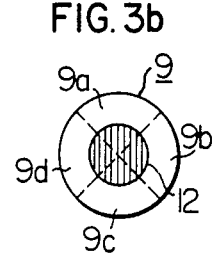
FIG. 3b
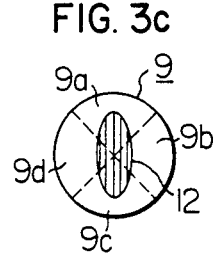
FIG. 3c
FIG. 3d
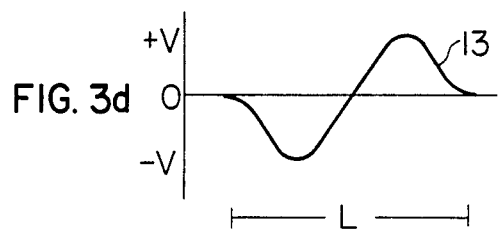

FOCUS SERVO SYSTEM HAVING OBJECT LENS PROTECTION CIRCUIT FOR AN OPTICAL DISC PLAYER

BACKGROUND OF THE INVENTION

The present invention relates to an optical video disc player which employs a laser beam, and more particularly to a focus servo system for an optical video disc player.

The optical video disc player usually includes a laser beam generator and a laser beam emitted from the laser beam generator is directed to a disc and reflected thereby. The disc has pits formed thereon in accordance with a record signal. A direction of propagation of the laser beam reflected by the disc differs depending on whether the pit is present at the reflection area or not. Accordingly, the reflected laser beam is sensed by a photosensitive element, the presence of the pit is detected and the signal recorded on the disc is detected. FIGS. 1a and 1b show an optical system of the optical video disc player. A laser beam 10 emitted from a laser light source 1 is applied to a collimating lens 2. The laser beam 10 is collimated by the collimating lens 2 and then applied to a prism/beam splitter 3, thence to a quarter wavelength plate 4. Since the laser beam 10 emitted from the laser light source 1 is linearly polarized light, the laser beam 10 is circularly polarized when it passes through the quarter wavelength plate 4. The laser beam 10 is then applied to an object lens 5, which focuses the beam 10 onto a disc 6. The laser beam 10 focused on the disc 6 is reflected by the disc 6 or a pit 6a. The reflected laser beam 11 has circular polarization of the opposite direction of rotation. It is again applied to the object lens 5, thence to the quarter wavelength plate 4. When it passes through the quarter wavelength plate 4, the reflected laser beam 11 has linear polarization which is orthogonal to the laser beam 10 and it is applied to the beam splitter 3 and reflected thereby. The laser beam 11 reflected by the beam splitter 3 passes through cylindrical lenses 7 and 8 and it is directed to a photosensitive element 9 which converts it to an electrical signal. The cylindrical lenses 7 and 8 and the photosensitive element 9 form an astigmatic sensor. In this system, the laser beam 10 must be exactly focused on the disc 6. Normally, the disc 6 is not always flat. Accordingly, the position of the object lens 5 is automatically adjusted such that a distance between the object lens 5 and the disc 6 is substantially equal to a focal distance of the object lens 5.

FIG. 2 shows a block diagram of a prior art focus servo system. It comprises a photosensor 9, a differential amplifier 14 serving as a subtraction circuit, a phase compensation circuit 15, a switch 22, an amplifier 23, an actuator drive circuit 24, an adder 16, a comparator 19, a signal generator 20, a switch 21 and an actuator 25. The actuator 25 is arranged around the object lens 5 to drive the object lens 5. The photosensor 9 comprises four photo-cells 9a, 9b, 9c and 9d. The oppositely arranged photo-cells 9a and 9c are interconnected and the oppositely arranged photo-cells 9b and 9d are interconnected. Output signals from the photo-cell pair 9a and 9c and the photo-cell pair 9b and 9d are supplied to the differential amplifier 14 which produces a differential signal 13, which is an error signal.

FIGS. 3a, 3b and 3c show light spots 12 formed on the photosensor 9. When the disc 6 is in focus, the light spot 12 at the center of the four photo-cells 9a, 9b, 9c and 9d is circular as shown in FIG. 3b, and the differential signal 13 from the differential amplifier 14 is zero. When the disc 6 is out of focus, the light spot 12 is elliptical as shown in FIGS. 3a and 3c. Depending on whether the disc 6 is positioned too far or too close, a major axis of the ellipse is in one direction as shown in FIG. 3a or in a transverse direction as shown in FIG. 3c. The differential signal 13 from the differential amplifier 14 is significant of sign and of amplitude of defocusing. When the distance D between the object lens 5 and the disc 6 is short, the output signal of the differential amplifier 14 is $-V$, and when the distance D is long, the output signal 13 is $+V$. The output signal 13 is supplied to the actuator 25 through the amplifier 23 and the actuator driver 24. Accordingly, when the distance D is short, the actuator 25 drives the object lens 5 away from the disc 6, and when the distance D is long, the actuator 25 drives the object lens 5 toward the disc 6 so that the laser beam 10 is focused on the disc 6 and the light spot 12 becomes circular on the photosensor 9. However, a dynamic range L of this system depends on the focal distances of the cylindrical lenses 7 and 8. Thus, if the object lens 5 goes too far away from the disc 6, the output signal 13 assumes $\pm 0$ V and the distance D between the object lens 5 and the disc 6 can not be correctly selected. If the distance D is very large, the switch 22 is opened and the servo system is deactivated. Thus, the output signal from the signal generator 20 is supplied to the actuator 25 through the amplifier 23 and the actuator driver 24 so that the actuator 25 is swept to drive the object lens 5 toward the disc 6. The output signals from the photo-cell pair 9a and 9c and the photo-cell pair 9b and 9d are also supplied to the adder 16, which produces a sum signal 17. The sum signal 17 is applied to the comparator 19 where it is compared with a voltage $E_o$ of a reference voltage source 18. The comparator 19 produces a low level (L) signal when the voltage $E_s$ of the sum signal 17 is lower than the voltage $E_o$ to open the switches 21 and 22. When the voltage $E_s$ of the sum signal 17 is higher than the voltage $E_o$, the comparator 19 produces a high level (H) signal to close the switches 21 and 22. When the switches 21 and 22 are open and the output signal from the signal generator 20 is supplied to the actuator 25 through the amplifier 23 and the actuator driver 24, the object lens 5 gradually approaches the disc 6 and the adder 16 produces the output signal 17 as shown in FIG. 4(a). As the object lens 5 further approaches the disc 6, the voltage $E_s$ of the output signal 17 rises, and when the voltage $E_s$ of the output signal exceeds the voltage $E_o$ at a time $t_1$ or a distance $D_1$, the output signal 26 of the comparator 19 assumes the high level (H) as shown in FIG. 4(b) and the switches 21 and 22 are closed. As the switches 21 and 22 are closed, the output signal of the signal generator 20 is not supplied to the amplifier 23 and the output signal 13 of the differential amplifier 14 is supplied to the actuator 25 through the phase compensation circuit 15, the switch 22, the amplifier 23 and the actuator driver 24. Accordingly, the servo system is activated after the time $t_1$.

However, in the prior art focus servo system described above, the integration of an energy supplied from the differential amplifier 14 to the actuator 25 is so large that the object lens 5 is accelerated and it is not stopped at a time $t_2$ when the object lens 5 has reached an optimum distance $D_2$, and the object lens 5 further approaches the disc 6, though the servo system still works to return the object lens 5 to the optimum distance $D_2$. When the sum signal goes below the voltage $E_o$ at a time $t_3$ or a distance $D_3$, the switches 21 and 22 are opened again and the output signal of the signal generator 20 for commanding the object lens 5 to approach the disc 6 is again supplied to the actuator 25. As a result, the object lens 5 further approaches the disc 6 and it finally collides against the disc 6.

SUMMARY OF THE INVENTION

It is an object of the present invention to provide a focus servo system which prevents an object lens from colliding against a disc.

When an integration of an energy supplied to an actuator is large, a velocity of movement of the object lens is high and a position of the object lens is not controlled even if the object lens is brought into a pull-in range of the servo system, and it departs from the pull-in range. When a focus error signal is large, a large energy is supplied to the actuator. Accordingly, if the system is designed such that a large energy is not supplied to the actuator, the velocity of movement of the object lens does not increase. In accordance with the present invention, when a focus error signal is large in a course of the focus pull-in, a servo system loop is open, and after the focal error signal has been reduced, the focus servo system loop is closed so that the velocity of movement of the object lens is reduced.

BRIEF DESCRIPTION OF THE DRAWINGS

The present invention will be apparent from the following detailed description taken in conjunction with the accompanying drawings, in which:

FIG. 2 shows a block diagram of a prior art focus servo system;

FIGS. 3a, 3b and 3c show diagrams of a four-photocell photo-sensor and a light spot;

FIG. 3d shows a waveform of a focus error signal;

DESCRIPTION OF THE PREFERRED EMBODIMENT

Figure 1A:
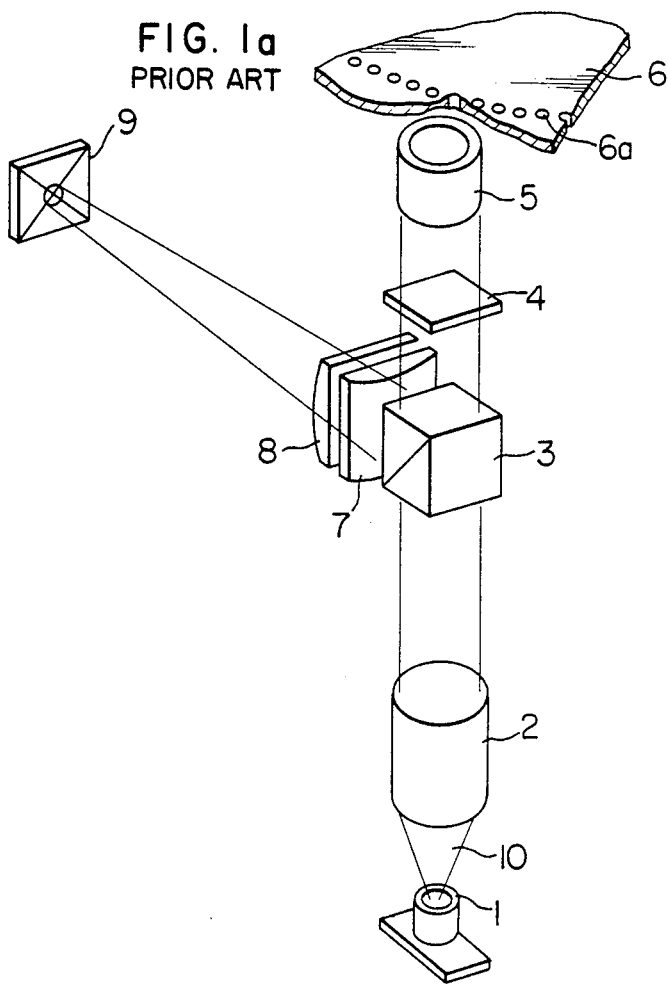
FIG. 1a shows a perspective view of an optical system of an optical disc player.
Figure 1B:
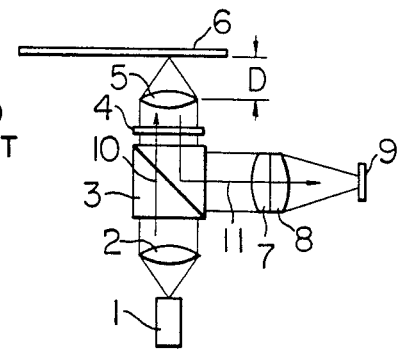
FIG. 1b shows a diagram thereof.
Figure 4:
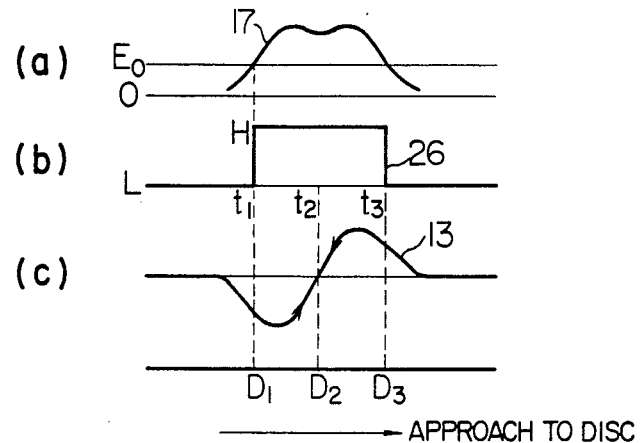
FIG. 4, consisting of a–c shows waveforms of signals in FIG. 2.
Figure 5:
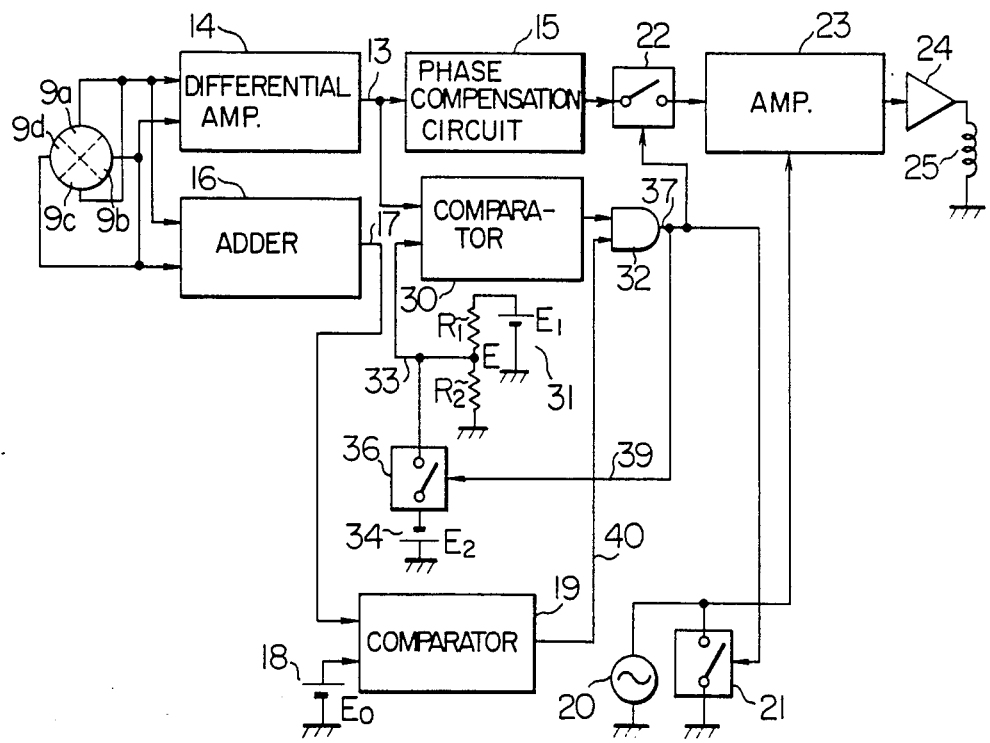
FIG. 5 shows a block diagram of a focus servo system of the present invention.
Figure 6:
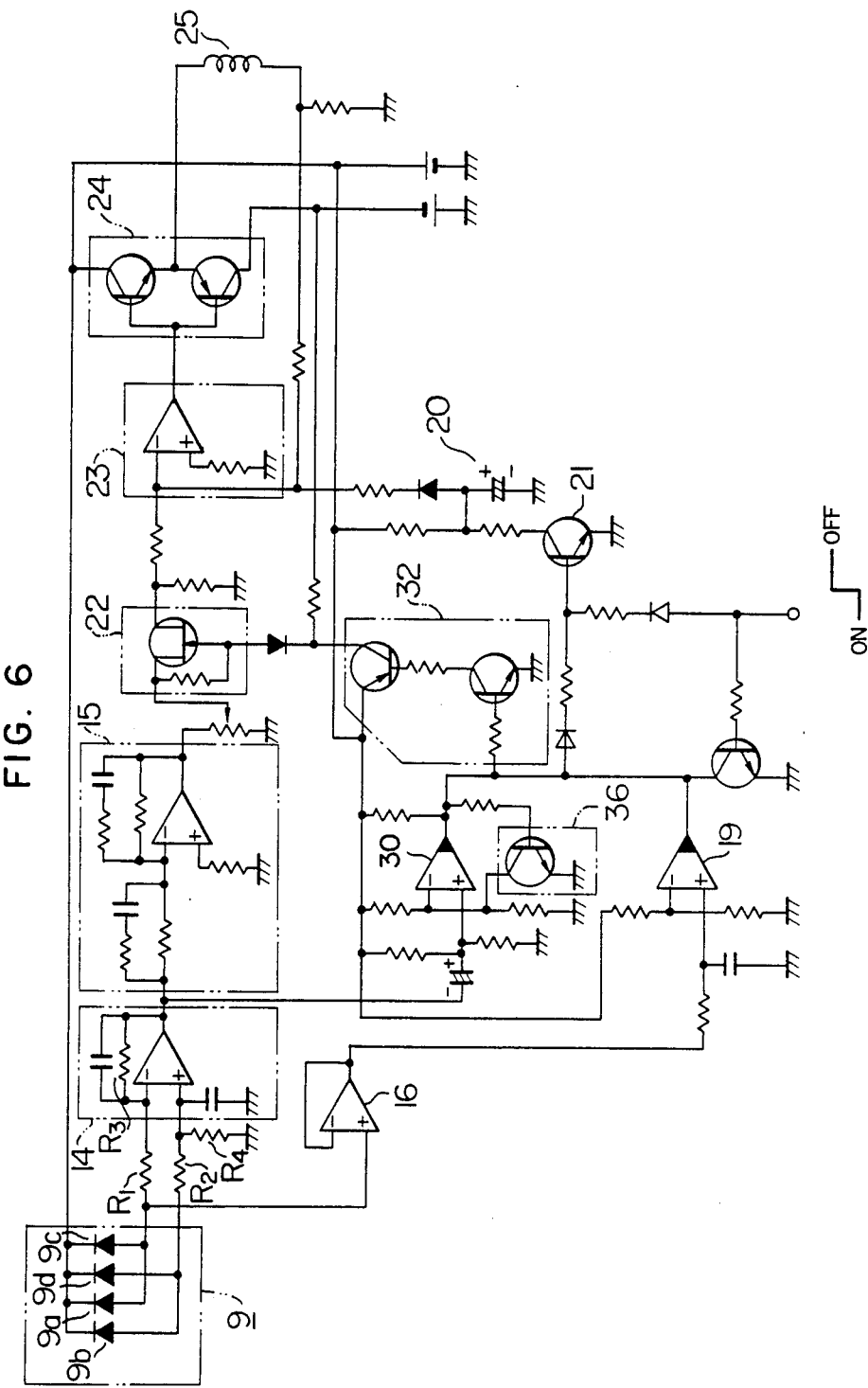
FIG. 6 shows a circuit diagram of the focus servo system of the present invention.

A block diagram of the focus servo system is shown in FIG. 5 and a specific circuit thereof is shown in FIG. 6. The servo system of the present invention comprises a second comparator 30 connected to the differential amplifier 14, a switch 36 for controlling a reference voltage E of the second comparator 30 and an AND gate which receives the output signal of the first comparator 19 and the output signal of the second comparator 30. The reference voltage E of the comparator 30 is supplied from a voltage source 31 or a voltage source 34. When the switch 36 is open, the reference voltage E is $\Delta E$ higher than a voltage corresponding to an optimum focus point F, and when the switch 36 is closed, the reference voltage E is equal to $E_2$ which is sufficiently lower than the voltage corresponding to the optimum focus point F. The comparator 30 produces a low level (L) output signal until the output signal 13 of the differential amplifier 14 reaches the voltage E $(=R_2 \cdot E_1/(R_1+R_2))$, and produces a high level (H) signal when the output signal 13 reaches the voltage E.

Figure 7:
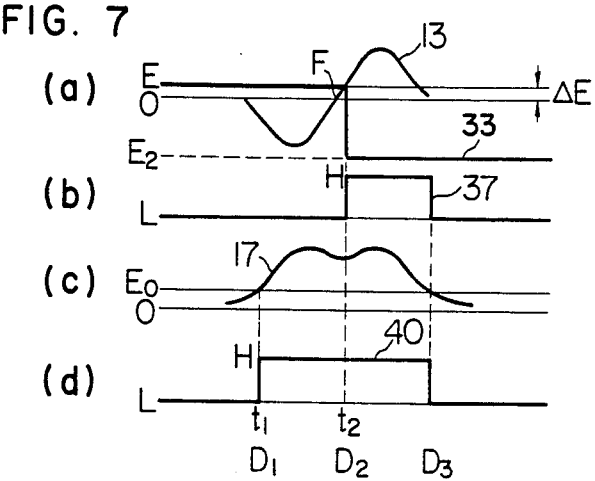
FIG. 7, consisting of a–d, shows waveforms of signals in FIGS. 5 and 6.

When the switches 21, 22 and 36 are open, the output signal of the signal generator 20 is supplied to the actuator 25 through the amplifier 23 and the actuator driver 24. As a result, the object lens 5 is driven toward the disc 6. When the output signal 17 of the adder 16 shown in FIG. 7(c) reaches the voltage $E_o$ of the voltage source 18 at the distance $D_1$ or the time $t_1$, the output signal 40 of the comparator 19 changes from the low level L to the high level H as shown in FIG. 7(d). However, since the low level L signal is applied to one input terminal of the AND circuit 32, the switches 21, 22 and 36 remain opened after the time $t_1$. Accordingly, the object lens 5 is further driven toward the disc 6. When the output signal 13 of the differential amplifier 14 shown in FIG. 7(a) reaches the reference voltage E of the comparator 30 at the distance $D_2$ or the time $t_2$, the output signal of the comparator 30 changes from the low level L to the high level H. As a result, the output signal 37 of the AND circuit 32 changes from the low level L to the high level H as shown in FIG. 7(b) and the switches 21, 22 and 36 are closed. Thus, the focus servo system is activated. After the time $t_2$, the signal of the signal generator 20 is not supplied to the amplifier 23. At the time $t_2$, since the energy supplied from the differential amplifier 14 to the actuator 25 through the amplifier 23 and the actuator driver 24 is small, the movement of the lens 5 is rapidly decelerated. The amount of energy supplied from the signal generator 20 to the actuator 25 until the time $t_2$ is not so large. Accordingly, the lens 5 is rapidly stopped after the distance $D_2$ or the time $t_2$ and does not reach the point $D_3$. Accordingly, the lens 5 does not collide against the disc 6.

When the switch 36 is closed at the time $t_2$, the reference voltage of the comparator 30 assumes the voltage $E_2$ of the voltage source 34 as shown in FIG. 7(a). The voltage $E_2$ is chosen to be sufficiently lower than the output signal 13 of the differential amplifier 14. Accordingly, even if the distance D between the lens 5 and the disc 6 increases from the distance $D_2$ to the distance $D_1$, the output signal of the comparator 30 is kept at the high level H. The output signal 37 of the AND gate 32 is also kept at the high level H so that the switches 21, 22 and 36 are kept closed and the servo system maintains the normal function. If the distance D between the lens 5 and the disc 6 exceeds the distance $D_1$ by some reason, the output signal 40 of the comparator 19 changes from the high level H to the low level L and the output signal 37 of the AND gate 32 also changes from the high level H to the low level L and the switches 21, 22 and 36 are opened. As a result, the lens 5 is again driven to the point $D_2$ toward the disc 6 by the open-loop system. When the distance D between the lens 5 and the disc 6 reaches the distance $D_2$, the servo system is activated. In this case, the lens 5, of course, does not collide against the disc 6.

Figure 8:
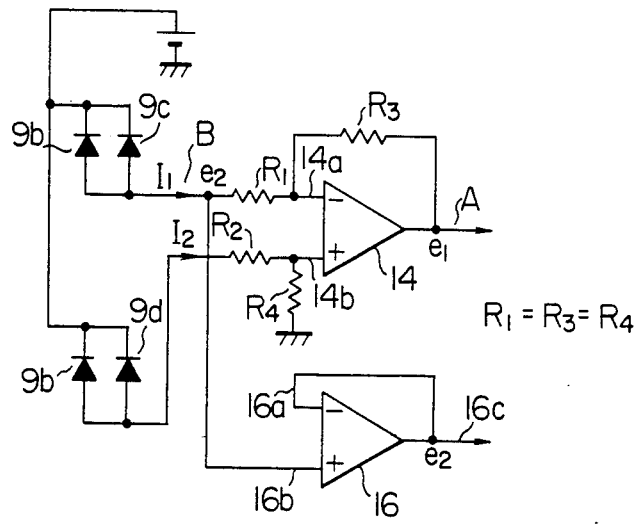
FIG. 8 shows a circuit diagram of a differential amplifier and an adder used in the present invention.

The operation of the differential amplifier 14 and the adder 16 shown in FIGS. 5 and 6 is explained with reference to FIG. 8. A sum $I_1$ of the output currents of the photo-cells 9a and 9c is supplied to an inverting input terminal 14a of the operational amplifier 14 through a resistor $R_1$, and a sum $I_2$ of the output currents of the photo-cells 9b and 9d is supplied to an input terminal 14b of the operational amplifier 14 through a resistor $R_2$. The output signal of the operational amplifier 14 is fed back to the input terminal 14a through a resistor $R_3$. In general, the output impedances of the photo-cells 9a, 9b, 9c and 9d are very high and the photo-cells 9a, 9b, 9c and 9d are constant current sources. Accordingly, voltages $e_1$ and $e_2$ at terminals A and B are given by the following equations.

$$e_1 = R_4 I_2 - R_3 I_1 \quad (1)$$

$$e_2 = R_4 I_2 + R_1 I_1 \quad (2)$$

If the resistors $R_3$ and $R_4$ are chosen such that $R = R_3 = R_4$, the output voltage $e_1$ of the operational amplifier 14 is given by the following equation.

$$e_1 = R(I_2 - I_3) \quad (3)$$

Accordingly, the operational amplifier 14 functions as the differential amplifier.

If the resistors $R_1$ and $R_4$ are chosen such that $R = R_1 = R_4$, the voltage $e_2$ is given by the following equation.

$$e_2 = R(I_2 + I_1) \quad (4)$$

Thus, the voltage $e_2$ is proportional to the sum of the currents $I_1$ and $I_2$. This voltage $e_2$ is supplied to an output terminal 16c of the voltage follower. The output terminal 16c of the voltage follower 16 is connected to an input terminal 16a thereof and the voltage $e_2$ is produced at the output terminal 16c of the voltage follower 16. As a result, the voltage follower 16 functions as the adder.

As described hereinabove, according to the present invention, the object lens is exactly driven to the pull-in range of the servo system and stopped within the pull-in range. The object lens never collides against the disc.

What is claimed is:

1. A focal servo system for an optical disc player wherein a laser beam is impinged through an object lens onto a disc having information recorded thereon such that the information is optically detected, and the laser beam reflected by the disc is sensed by a photosensor to reproduce the recorded information from the disc, comprising:

two pairs of photo-cells interconnected in each pair and arranged in a circle at an angle of 90 degrees from each other for receiving the laser beam reflected by said disc;

a differential amplifier connected to said two pairs of photo-cells for producing a differential signal of the output signals of said two pairs of photo-cells;

an adder connected to said two pairs of photo-cells for producing a sum signal of the output signals of said two pairs of photo-cells;

a phase compensation circuit connected to said differential amplifier for phase-compensating said differential signal of said differential amplifier; p1 a first comparator connected to said adder to receive said sum signal of said adder for comparing said sum signal with a predetermined first reference voltage and producing an output signal of a first state until said sum signal reaches said first reference voltage and producing an output signal of a second state when said sum signal is above said first reference voltage;

an actuator disposed in a vicinity of said object lens for driving said object lens toward or away from said disc;

a signal generator for generating a sweep signal to drive said object lens toward said disc;

an amplifier electrically connected to said actuator and connected to said phase compensation circuit and said signal generator for supplying the phase-compensated differential signal supplied from said phase compensation circuit, to said actuator and supplying said sweep signal supplied form said signal generator, to said actuator;

switches connected to said first comparator and actuated by the output signal of said first comparator for supplying said sweep signal from said signal generator to said amplifier when the output signal of said first comparator is in said first state and supplying said differential signal from said phase compensation circuit to said amplifier when the output signal of said first comparator is in said second state;

a second comparator connected to said differential amplifier to receive said differential signal from said differential amplifier for comparing said differential signal with a second predetermined reference voltage and producing an output signal of a third state until said reference voltage reaches said second reference voltage and producing an output signal of a fourth state when said differential signal is above said second reference voltage;

a logic circuit receiving the output signal of said first comparator and the output signal of said second comparator for maintaining the output signal of said first comparator supplied from said first comparator to said switches at said first state when said second comparator supplies the output signal of said third state and supplying the output signal of said first comparator to said switches when said second comparator supplies the output signal of said fourth state; and a reference voltage selection switch connected to said second comparator and said logic circuit to receive the output signal of said logic circuit for switching said second reference voltage to a third reference voltage different from said second reference voltage and maintaining the output signal of said second comparator at said fourth state when the output signal of said logic circuit is at said second state.

2. A focus servo system according to claim 1, wherein said differential amplifier includes:

an operational amplifier having a non-inverting input terminal thereof connected to the first photo-cell pair;

a first resistor having one end thereof connected to an inverting terminal of said operational amplifier and the other end thereof connected to the second photo-cell pair;

a second resistor having one end thereof connected to an output terminal of said operational amplifier and the other end thereof connected to said inverting input terminal of said operational amplifier and having the same resistance as said first resistor; and a third resistor having one end thereof connected to said non-inverting input terminal of said operational amplifier and the other end thereof grounded and having the same resistance as said first resistor.

3. A focus servo system according to claim 1, wherein said differential amplifier includes:
- an operational amplifier having a non-inverting input terminal thereof connected to the first photo-cell pair;
- a first resistor having one end thereof connected to an inverting terminal of said operational amplifier and the other end thereof connected to the second photo-cell pair;
- a second resistor having one end thereof connected to an output terminal of said operational amplifier and the other end thereof connected to said inverting input terminal of said operational amplifier and having the same resistance as said first resistor; and
- a third resistor having one end thereof connected to said non-inverting input terminal of said operational amplifier and the other end thereof grounded and having the same resistance as said first resistor; and
- wherein said adder includes a voltage follower having a non-inverting input terminal thereof connected to the junction of said first resistor and said first photo-cell pairs.

4. A focus servo system for an optical disc player comprising;
- means for projecting a beam onto a disc to be played, said beam projecting means being movable with respect to said disc;
- means for driving said beam projecting means to alter a distance between said beam projecting means and said disc;
- means for receiving a reflection beam reflected from said disc to produce a first output signal representing an amount and direction of deviation from an optimum distance point between said beam projecting means and said disc, and a second output signal predetermined distance range within which said optimum distance point falls;
- means connected to said reflection beam receiving means and said driving means, for servo controlling said beam projecting means in accordance with the first output signal of said beam receiving means;
- means connected to said driving means for open-loop controlling said beam projecting means; and
- enabling means connected to said reflection beam receiving means, said servo control means and said open-loop control means, for selectively enabling both said control means in response to the first and second output signals of said beam receiving means, said enabling means enabling said servo control means when said beam projecting means is within said predetermined distance range, excepting that said enabling means enables said open-loop control means when said beam projecting means is approaching said disc from outside said predetermined distance range to said optimum distance point within said predetermined distance range, said enabling means including;
- a first comparator for comparing the second output signal of said reflection beam receiving means with a first reference value,
- a second comparator for comparing the first output signal of said reflection beam receiving means with a second reference value,
- a logic circuit connected to said first and second comparators, for making a logical operation of comparison results by said comparators,
- first and second switch means connected to said servo control means and said open-loop control means, respectively, and said logic circuit, for alternatively enabling both said control means in response to an output state of said logic circuit, and
- third switch means connected to said second comparator and said logic circuit, foir altering said second reference value at least when said beam projecting means approaching said disc from outside said predetermined distance range has reached said optimum distance point.

5. A focus servo system according to claim 4, wherein said reflection beam receiving means includes:
- two pairs of photo-cells interconnected in each pair and arranged in a circle at an angle of 90 degrees from each other;
- a subtraction circuit connected to said two pairs of photo-cells for producing said first output signal; and
- an adder circuit connected to said two pairs of photo-cells for producing said second output signal.

* * * * *